US010766144B2

(12) United States Patent
Casner et al.

(10) Patent No.: US 10,766,144 B2
(45) Date of Patent: Sep. 8, 2020

(54) MAP RELATED ACOUSTIC FILTERING BY A MOBILE ROBOT

(71) Applicant: Digital Dream Labs, LLC, Pittsburgh, PA (US)

(72) Inventors: Daniel Thomas Casner, Livermore, CA (US); Lee Crippen, Berkeley, CA (US); Hanns W. Tappeiner, San Francisco, CA (US); Anthony Armenta, Saratoga, CA (US); Kevin Yoon, Oakland, CA (US)

(73) Assignee: DIGITAL DREAM LABS, LLC, Pittsburgh, PA (US)

( * ) Notice: Subject to any disclaimer, the term of this patent is extended or adjusted under 35 U.S.C. 154(b) by 305 days.

(21) Appl. No.: 15/924,145

(22) Filed: Mar. 16, 2018

(65) Prior Publication Data
US 2019/0212441 A1   Jul. 11, 2019

Related U.S. Application Data

(60) Provisional application No. 62/614,942, filed on Jan. 8, 2018.

(51) Int. Cl.
*G01S 15/89* (2006.01)
*G01S 7/52* (2006.01)
(Continued)

(52) U.S. Cl.
CPC ............. *B25J 13/003* (2013.01); *B25J 5/005* (2013.01); *B25J 9/162* (2013.01); *B25J 9/1694* (2013.01);
(Continued)

(58) Field of Classification Search
CPC ...... B25J 13/003; B25J 13/089; B25J 13/081; B25J 9/1694; B25J 9/162; B25J 5/005;
(Continued)

(56) References Cited

U.S. PATENT DOCUMENTS

2006/0075422 A1* 4/2006 Choi .................... G01S 3/7864
   725/18
2009/0030552 A1* 1/2009 Nakadai ............... G10L 21/028
   700/258
(Continued)

FOREIGN PATENT DOCUMENTS

JP         2014137226 A   *  7/2014
WO    WO-2019136445 A1  *  7/2019  .............. B25J 5/005

OTHER PUBLICATIONS

Adaptive Antennas, "Types of Beamforming," dated Feb. 27, 2017, 32 pages.
(Continued)

*Primary Examiner* — Daniel Pihulic
(74) *Attorney, Agent, or Firm* — David G. Oberdick

(57) ABSTRACT

This specification relates to robots and audio processing in robots. One aspect of the subject matter includes: a body and one or more physically moveable components; a plurality of microphones; one or more processors; and one or more storage devices storing instructions that are operable, when executed by the one or more processors, to cause the robot to perform operations. The operations can include: obtaining map data of an environment of the robot; selecting a test location from the map data; navigating to the selected test location; receiving a sound wave propagating through the environment of the robot; computing one or more acoustic transfer functions for the test signal, wherein each acoustic transfer function represents how the test signal was transformed by the environment of the robot during its propogation through the environment of the robot; and storing each of the transfer functions in association with the test location.

31 Claims, 8 Drawing Sheets

(51) Int. Cl.

| | |
|---|---|
| *H04R 3/00* | (2006.01) |
| *H04R 1/02* | (2006.01) |
| *G05D 1/00* | (2006.01) |
| *G05D 1/02* | (2020.01) |
| *B25J 13/00* | (2006.01) |
| *H04R 3/04* | (2006.01) |
| *G10L 21/02* | (2013.01) |
| *B25J 5/00* | (2006.01) |
| *B25J 9/16* | (2006.01) |
| *B25J 13/08* | (2006.01) |
| *H04R 1/40* | (2006.01) |
| *H04S 7/00* | (2006.01) |
| *G10L 21/0216* | (2013.01) |
| *H04R 29/00* | (2006.01) |
| *G01S 3/80* | (2006.01) |

(52) U.S. Cl.
CPC ........... *B25J 13/081* (2013.01); *B25J 13/089* (2013.01); *G01S 7/52004* (2013.01); *G01S 15/89* (2013.01); *G05D 1/0088* (2013.01); *G05D 1/027* (2013.01); *G05D 1/0231* (2013.01); *G05D 1/0255* (2013.01); *G05D 1/0291* (2013.01); *G10L 21/02* (2013.01); *H04R 1/028* (2013.01); *H04R 1/406* (2013.01); *H04R 3/005* (2013.01); *H04R 3/04* (2013.01); *H04S 7/30* (2013.01); *G01S 3/80* (2013.01); *G10L 2021/02166* (2013.01); *H04R 29/00* (2013.01); *H04S 2400/15* (2013.01); *Y10S 901/01* (2013.01); *Y10S 901/46* (2013.01)

(58) Field of Classification Search
CPC .... G05D 1/0291; G05D 1/027; G05D 1/0231; G05D 1/0255; G05D 1/0088; H04R 1/028; H04R 3/005; H04R 29/00; H04R 3/04; H04R 1/406; G01S 15/89; G01S 3/80; G01S 5/0215; G01S 7/52004; G10L 2021/02166; G10L 21/02; H04S 2400/15; H04S 7/30; Y10S 901/01; Y10S 901/46
See application file for complete search history.

(56) References Cited

U.S. PATENT DOCUMENTS

| | | | |
|---|---|---|---|
| 2015/0088497 A1* | 3/2015 | Gomez | G10L 21/0208 704/226 |
| 2019/0210227 A1* | 7/2019 | Casner | B25J 13/003 |
| 2019/0212441 A1* | 7/2019 | Casner | H04S 7/30 |

OTHER PUBLICATIONS

InvenSense Application Note AN-1140 Revision 1.0, "Microphone Array Beamforming," Revision date Dec. 31, 2013, 12 pages.

* cited by examiner

MAP RELATED ACOUSTIC FILTERING BY A MOBILE ROBOT

CROSS REFERENCE TO RELATED APPLICATIONS

This application claims the benefit under 35 U.S.C. § 119(e) of the filing date of U.S. Patent Application No. 62/614,942, for Spatial Acoustic Filtering by a Mobile Robot, which was filed on Jan. 8, 2018, and which is incorporated here by reference.

BACKGROUND

This specification relates generally to robots, and more particularly to audio processing for consumer robots.

A robot is a physical machine configured to perform physical actions autonomously or semi-autonomously. Robots have one or more integrated control subsystems that effectuate the physical movement of one or more robotic components in response to particular inputs. Robots can also have one or more integrated sensors that allow them to detect particular characteristics of the robot's environment. Modern day robots are typically electronically controlled by dedicated electronic circuitry, programmable special-purpose or general-purpose processors, or some combination of these. Robots can also have integrated networking hardware that allows the robot to communicate over one or more communications networks, e.g., over Bluetooth, NFC, or Wi-Fi.

A number of devices rely on microphones to detect the presence of a nearby sound, and have a need to localize the source of that sound so that they can focus on and process that particular sound versus other ambient noise, e.g. because that sound is a voice command coming from a user seeking to interact with the device. In many cases, these devices have no indication of the direction from which to expect an audio input, and that audio input can come from any location or multiple locations in the environment. Thus, these devices often initially listen in all directions, for example, by making use of an array of omnidirectional microphones. Doing so, allows a device to determine the correct direction of a sound source so the device can, for example, best isolate it. One method of determining a direction of an emitter is to compare the arrival times of a signal across a microphone array. If a microphone A detects a sound wave before a microphone B, it can be extrapolated that the emitter of the sound wave is physically closer to microphone A than it is to microphone B.

After determining a likely direction of the emitter, some devices proceed to focus their microphones in the determined direction of the emitter to reduce the effects of ambient noise on the sound signal. Spatial filtering refers generally to signal processing techniques for this task, and can be performed on a system that includes a processor and a microphone array. Each microphone in the array receives a version of the emitted signal that is different from that received by its neighbors, due to each microphone's unique position relative to the emitter. A device can then generate a spatial filter by applying weighted and time-shifted summations of the different versions of the signal generated by the microphones. This allows the device to strengthen signals received in the direction of the emitter, e.g., by using constructive interference. Similarly, the system can also reduce the effects of noise, e.g., by using destructive interference.

SUMMARY

This specification relates to robots and audio processing in robots. In general, one innovative aspect of the subject matter described in this specification can be embodied in a robot that includes: a body and one or more physically moveable components; a plurality of microphones; one or more processors; and one or more storage devices storing instructions that are operable, when executed by the one or more processors, to cause the robot to perform operations. The operations can include: obtaining map data of an environment of the robot; selecting a test location from the map data; navigating to the selected test location; receiving a test signal of a sound wave propagating through the environment of the robot; computing one or more acoustic transfer functions for the test signal, wherein each acoustic transfer function represents how the test signal was transformed by the environment of the robot while the sound wave propagated through the environment of the robot; and storing each of the transfer functions in association with the test location.

The operations can further include: receiving, by the robot, an original audio signal at a particular location in the environment of the robot; obtaining one of the previously computed acoustic transfer functions associated with the particular location; and computing a recovered audio signal by applying the previously computed acoustic transfer function for the particular location to the received original audio signal.

Obtaining one of the previously computed acoustic transfer functions associated with the particular location can include determining a previous test location that is closest in the environment of the robot to the test location.

The operations can further include: repeatedly and automatically selecting new test locations in the environment of the robot; computing one or more additional acoustic transfer functions for each new test location; and storing each additional acoustic transfer function in association with each respective new test location.

Selecting a new test location can include: computing, for each of a plurality of areas in the environment of the robot, a respective measure of density of previously tested locations; and selecting a particular location in an area of the environment having a density that satisfies a threshold.

The test signal can be emitted by the robot. Alternatively, or in addition, the test signal can be emitted by a different second robot or a stationary sound emitter.

Another innovative aspect of the subject matter described in this specification can be embodied in a robot that includes: a body and one or more physically moveable components; a plurality of microphones; one or more processors; and one or more storage devices storing instructions that are operable, when executed by the one or more processors, to cause the robot to perform operations. The operations can include: determining a current location of the robot in an environment of the robot; determining that the current location is associated with one or more location-specific audio processing techniques; obtaining, by the plurality of microphones, respective audio signals of sound waves propagating in the environment of the robot; and processing the audio signals according to the one or more location-specific audio processing techniques.

The one or more location-specific audio processing techniques can include a location-specific acoustic filter.

Determining that the current location of the robot is associated with one or more location-specific audio processing techniques can include determining that the current location of the robot is within a threshold distance of a wall in the environment of the robot, and the location-specific acoustic filter can amplify audio signals of sound waves reflecting off the wall.

Determining that the current location of the robot is associated with one or more location-specific audio processing techniques can include determining that the current location of the robot is in a hallway of the environment of the robot, and the location-specific acoustic filter can amplify audio signals of sound waves traveling along the hallway.

The one or more location-specific audio processing techniques can include a location-specific acoustic transfer function.

Determining that the current location of the robot is associated with one or more location-specific audio processing techniques can include determining that the current location of the robot is in a dynamic area having obstacles that are likely to change orientation, and the location-specific acoustic transfer function can be an object-specific transfer function that represents how sound waves are transformed by a particular object.

The object-specific transfer function can represent how sound waves are transformed by a closed door or an open door. The object-specific transfer function can represent how sound waves are transformed by furniture in the environment of the robot.

Another innovative aspect of the subject matter described in this specification can be embodied in a robot that includes: a body and one or more physically moveable components; a plurality of microphones; one or more processors; and one or more storage devices storing instructions that are operable, when executed by the one or more processors, to cause the robot to perform operations. The operations can include: receiving, by the robot, one or more audio signals at a particular location in an environment of the robot; selecting, based on the particular location of the robot, a plurality of precomputed acoustic transfer functions from a database of acoustic transfer functions that associates each acoustic transfer function with a respective location in the environment of the robot; computing a single composite acoustic transfer function from the plurality of selected acoustic transfer functions; and processing the received one or more audio signals using the composite acoustic transfer function.

Selecting the plurality of precomputed acoustic transfer functions can include determining which acoustic transfer functions are associated with locations in the environment that are closest to the location of the robot.

Computing a single composite acoustic transfer function from the plurality of selected acoustic transfer functions can include assigning a respective weight to each acoustic transfer function based on a respective distance between a location associated with the acoustic transfer function and the particular location of the robot.

The acoustic transfer functions in the database of acoustic transfer functions are precomputed by the robot moving to multiple locations within the environment of the robot.

The operations can further include: generating the database of acoustic transfer functions, including repeatedly performing operations comprising: selecting a test location from map data of the environment of the robot, navigating to the selected test location, receiving a test signal of a sound wave propagating through the environment of the robot, computing one or more acoustic transfer functions for the test signal, wherein each acoustic transfer function represents how the test signal was transformed by the environment of the robot while the sound wave propagated through the environment of the robot, and storing each of the transfer functions in association with the test location in the database.

The test signal can be emitted by the robot. The test signal can be emitted by a different second robot or a stationary sound emitter.

Another innovative aspect of the subject matter described in this specification can be embodied in a robot that includes: one or more computers and one or more storage devices storing instructions that are operable, when executed by the one or more computers, to cause the one or more computers to perform operations. The operations can include: (a) receiving data representing a plurality of transfer functions that each represents how a sound wave was transformed by the environment of a robot while the sound wave propagated from a respective sound origin in the environment of the robot to a respective sound destination in the environment of the robot; (b) selecting a plurality of sound origins associated with one of the plurality of transfer functions; (c) computing a plurality of candidate locations in the environment of the robot; (d) evaluating each candidate location of the plurality of candidate locations, including: (i) computing a respective origin score for each selected sound origin of the plurality of selected sound origins, each respective score representing a decrease in sound quality of a sound wave propagating from the selected sound origin to the candidate location according to a particular transfer function having the candidate location as a sound destination; and (ii) computing an aggregate score for the candidate location based on the origin scores computed between the selected sound origins and the candidate location; (e) determining a candidate location of the plurality of candidate locations having a best aggregate score; and (f) providing, to the robot, data that causes the robot to navigate within the environment of the robot to the candidate location having the best aggregate score.

Each origin score can represent a measure of volume change or a measure of distortion according to a particular transfer function.

Providing data that causes the robot to navigate within the environment of the robot to the candidate location having the best aggregate score can include providing data identifying the candidate location.

Providing the data causes the robot to navigate to the candidate location upon receiving a downtime trigger.

The plurality of transfer functions can be computed automatically by the robot navigating within the environment of the robot.

The one or more computers and one or more storage devices can be installed on the robot, and the robot can include a body and one or more physically moveable components.

Selecting a plurality of sound origins associated with one of the plurality of transfer functions can include selecting peripheral locations within the environment of the robot.

Selecting a plurality of sound origins associated with one of the plurality of transfer functions can include selecting locations associated with entryways, doors, or windows.

The operations and further include determining at least one of a pose and orientation in order to improve its ability to process audio of interest.

The subject matter described in this specification can be implemented in particular embodiments so as to realize one or more of the following advantages. Robots can use acoustic transfer functions (hereafter, "transfer functions") to improve the signal quality of received audio signals. A transfer function represents how an audio signal is transformed between two locations in a particular environment, e.g., due to the acoustic properties of its medium. A device receiving an audio signal can apply an inverse transfer function to recover the original audio signal, e.g., removing distortion and noise.

Computing spatial filters is most practical for devices that do not move (such as smart speakers) or that move slowly. But for mobile robots that are capable of rapid movements, even spatial filters computed in real time are often ineffective. In other words, by the time a robot has performed the computations to generate a spatial filter, the location of the emitter relative to the robot can have already changed dramatically based on the movement of the robot itself (even assuming the emitter is stationary). Mobile robots, and the associated methods, described in this specification effectively recover original audio signals from audio emitters.

The robot can also maintain a map of an environment of the robot. Not only can the robot determine its location on the map, it can also use the map to store spatial filters and acoustic transfer functions. The robot can access the stored acoustic information that corresponds to the robot's current location, so that the robot can save computing resources.

DETAILED DESCRIPTION

Figure 1:
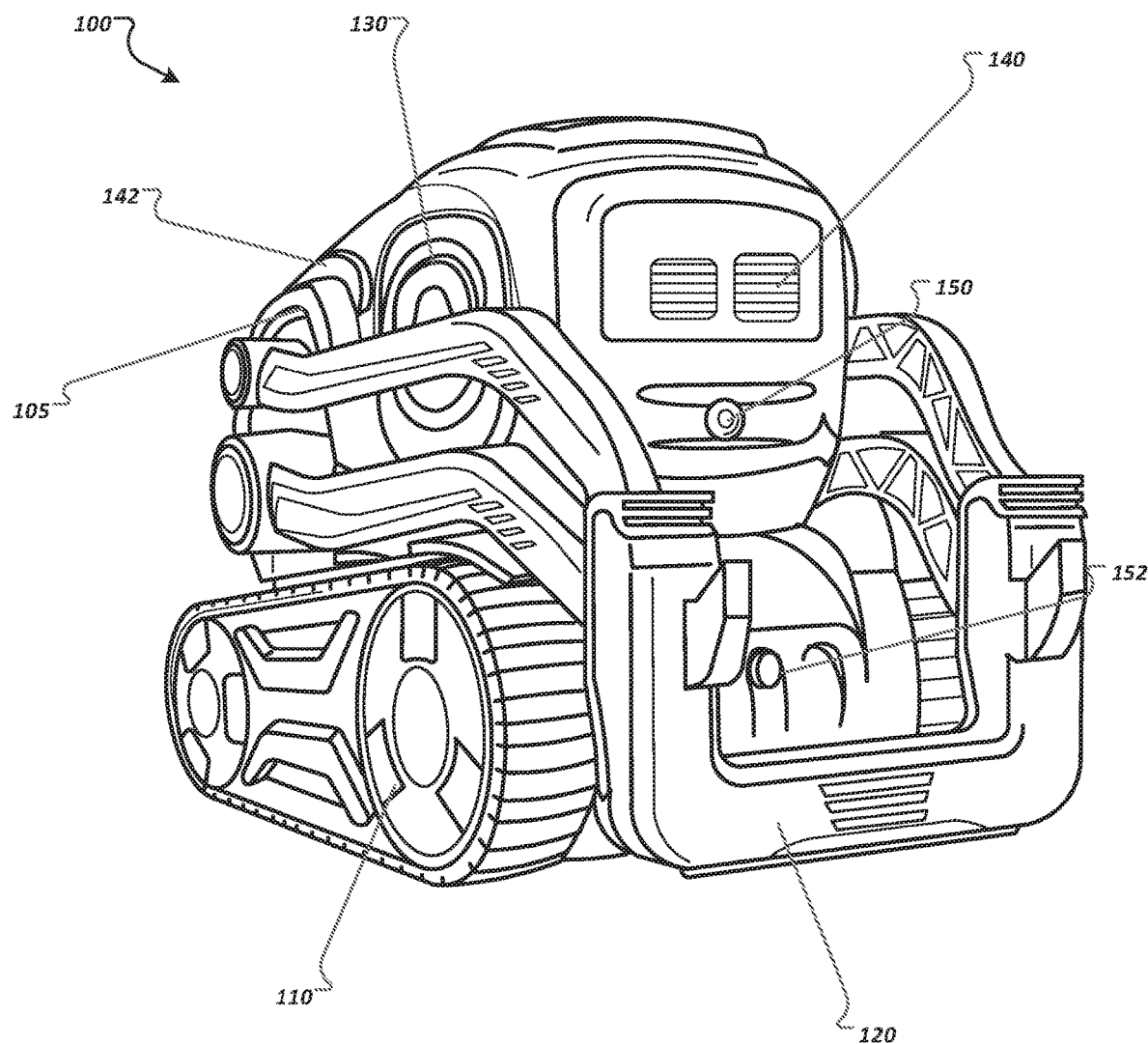
FIG. 1 illustrates an example robot.

FIG. 1 illustrates an example robot 100. The robot 100 is an example of a mobile autonomous robotic system on which the spatial filtering techniques described in this specification can be implemented. The robot 100 can use the techniques described below for use as a toy, or as a personal companion, and/or as an assistant or security monitor. The robot 100 generally includes a body 105 and a number of physically moveable components. The components of the robot 100 can house data processing hardware and control hardware of the robot. The physically moveable components of the robot 100 include a locomotion system 110, a lift 120, and a head 130.

The robot 100 also includes integrated output and input subsystems. The output subsystems can include control subsystems that cause physical movements of robotic components; presentation subsystems that present visual or audio information, e.g., screen displays, lights, and speakers; and communication subsystems that communicate information across one or more communications networks, to name just a few examples.

The control subsystems of the robot 100 include a locomotion subsystem 110. In this example, the locomotion system 110 has wheels and treads. The robot 100 can independently operate each wheel subsystem, which allows the robot to spin and perform smooth arcing maneuvers. In some implementations, the locomotion subsystem 110 includes sensors that provide feedback representing how quickly one or more of the wheels are turning. The robot can use this information to control its position and speed.

The control subsystems of the robot 100 include an effector subsystem 120 that is operable to manipulate objects in the robot's environment. In this example, the effector subsystem 120 includes a lift and one or more motors for controlling the lift. The robot 100 can use the effector subsystem 120 to lift and manipulate objects in the robot's environment. The effector subsystem 120 can also be used as an input subsystem, which is described in more detail below.

The control subsystems of the robot 100 also include a robot head 130, which has the ability to tilt up and down and optionally side to side. On the robot 100, the tilt of the head 130 also directly affects the angle of a camera 150.

The presentation subsystems of the robot 100 include one or more electronic displays, e.g., electronic display 140, which can each be a color or a monochrome display. The robot 100 can also use the electronic display 140 to display any appropriate information. In FIG. 1, the electronic display 140 is presenting a simulated pair of eyes. The presentation subsystems of the robot 100 also include one or more lights 142 that can each turn on and off, optionally in multiple different colors.

The presentation subsystems of the robot 100 can also include one or more speakers, which can play one or more sounds in sequence or concurrently so that the sounds are at least partially overlapping.

The input subsystems of the robot 100 include one or more perception subsystems, one or more audio subsystems, one or more touch detection subsystems, one or more motion detection subsystems, one or more effector input subsystems, and one or more accessory input subsystems, to name just a few examples.

The perception subsystems of the robot 100 are configured to sense light from an environment of the robot. The perception subsystems can include a visible spectrum camera, an infrared camera, or a distance sensor, to name just a few examples. For example, the robot 100 includes an integrated camera 150. The perception subsystems of the robot 100 can include one or more distance sensors. Each distance sensor generates an estimated distance to the nearest object in front of the sensor.

The perception subsystems of the robot 100 can include one or more light sensors. The light sensors are simpler electronically than cameras and generate a signal after detecting a sufficient amount of light. In some implementations, light sensors can be combined with light sources to implement integrated cliff detectors on the bottom of the robot. When light generated by a light source is no longer reflected back into the light sensor, the robot 100 can interpret this state as being over the edge of a table or another surface.

The audio subsystems of the robot 100 are configured to receive audio input from the environment of the robot. For example, the robot 100 can include a directional microphone subsystem having one or more microphones. The directional microphone subsystem also includes post-processing functionality that generates a direction, a direction probability distribution, location, or location probability distribution in a particular coordinate system in response to receiving a sound. Each generated direction represents a potential direction from which the sound originated. The directional microphone subsystem can use various conventional beamforming algorithms to generate the directions. Example audio subsystems and techniques are described in more detail below with reference to FIGS. 2-5.

The touch detection subsystems of the robot 100 are configured to determine when the robot is being touched or touched in particular ways. The touch detection subsystems can include touch sensors, and each touch sensor can indicate when the robot is being touched by a user, e.g., by measuring changes in capacitance. The robot can include touch sensors on dedicated portions of the robot's body, e.g., on the top, on the bottom, or both. Multiple touch sensors can also be configured to detect different touch gestures or modes, e.g., a stroke, tap, rotation, or grasp.

The motion detection subsystems of the robot 100 are configured to measure movement of the robot. The motion detection subsystems can include motion sensors and each motion sensor can indicate that the robot is moving in a particular way. For example, a gyroscope sensor can indicate an orientation of the robot relative to the Earth's gravitational field. As another example, an accelerometer can indicate a direction and a magnitude of an acceleration.

The effector input subsystems of the robot 100 are configured to determine when a user is physically manipulating components of the robot 100. For example, a user can physically manipulate the lift of the effector subsystem 120, which can result in an effector input subsystem generating an input signal for the robot 100. As another example, the effector subsystem 120 can detect whether or not the lift is currently supporting the weight of any objects. The result of such a determination can also result in an input signal for the robot 100.

The robot 100 can also use inputs received from one or more integrated input subsystems. The integrated input subsystems can indicate discrete user actions with the robot 100. For example, the integrated input subsystems can indicate when the robot is being charged, when the robot has been docked in a docking station, and when a user has pushed buttons on the robot, to name just a few examples.

The robot 100 can also use inputs received from one or more accessory input subsystems that are configured to communicate with the robot 100. For example, the robot 100 can interact with one or more toy cubes configured with electronics that allow the cubes to communicate with the robot 100 wirelessly. Such accessories configured to communicate with the robot can have embedded sensors that communicate outputs to the robot 100 either directly or over a network connection. For example, a cube can have one or more integrated microphones and can communicate signals generated by the microphones to the robot. Another example accessory input subsystem is a mobile computing device, e.g., a mobile phone or a table computer. These devices can transmit signals generated by integrated microphones to the robot.

The accessory input subsystems can also include one or more microphones. The one or more microphones can receive audio input from the environment of the robot 100 and communicate the audio input to the robot either directly or over a network connection. For example, a microphone can communicate audio input to the robot 100 to indicate the presence of a user.

The robot 100 can also use inputs from one or more environmental sensors that each indicate a particular property of the environment of the robot. Environmental sensors include temperature sensors and humidity sensors to name just a couple examples.

One or more of the input subsystems described above may also be referred to as "sensor subsystems." The sensor subsystems allow a robot to determine when a user is paying attention to the robot, e.g., for the purposes of providing user input, using a representation of the environment rather than through explicit electronic commands, e.g., commands generated and sent to the robot by a smartphone application. The representations generated by the sensor subsystems may be referred to as "sensor inputs."

The robot can also receive information from one or more additional robots that are in proximity to the robot. For example, the information can be related to the location of each of the one or more additional robots. Each robot can communicate its location to the other robots in the environment, for example, by periodically sending its location to the other robots. In one implementation, each robot can send its location once every millisecond. In other implementations, each robot can send its location more or less than once every millisecond. Each robot can also send its location only after completing a change in its location. For example, after moving from a first location to a second location, a robot can communicate the second location to one or more robots that are in proximity to it. As previously mentioned, the robot can store its location and signal processing information on a map. A plurality of robots that are in proximity to each other can also send their maps to each other. The plurality of robots can also share a common map that each robot can access and update via a network.

The robot can record the locations of the one or more additional robots on its local map, so that the robot knows the location of each additional robot at any given time. The robot can also determine the locations of the one or more additional robots from the common map. The robot can also receive information related to sound emitters present in the environment of the robot from the one or more additional robots. For example, the robot can determine the direction of a sound emitter using audio information received by the one or more additional robots and the locations of the one or more additional robots. As previously discussed, the robot can estimate a direction of a sound emitter using input from one or more sensors. The robot can also update the estimated direction based on information received by the one or more additional robots. The information can include sensory input and one or more estimated directions of the emitter received from the one or more additional robots.

In addition to accessing information from the one or more additional robots, the robot can also use that information to calculate signal processing information such as a spatial filter and a transfer function. For example, the robot can receive signal processing information from the one or more additional robots, and use this signal processing information to calculate a spatial filter or a transfer function, as described in more detail below with regard to FIG. 5A.

The robot 100 also includes computing subsystems having data processing hardware, computer-readable media, and networking hardware. Each of these components can serve to provide the functionality of a portion or all of the input and output subsystems described above or as additional input and output subsystems of the robot 100, as the situation or application requires. For example, one or more integrated data processing apparatus can execute computer program instructions stored on computer-readable media in order to provide some of the functionality described above.

The robot 100 can also be configured to communicate with other devices. For example, the robot 100 can communicate wirelessly with nearby mobile computing devices as well as cloud-based computing systems having one or more computers in one or more locations. A nearby mobile device can communicate with the robot 100 to provide commands and display feedback to a user, e.g., through use of an installed mobile application. A cloud-based computing system can provide online support services for the robot. For example, the robot can offload portions of some of the operations described in this specification to the cloud-based system, e.g., for determining behaviors, computing signals, and performing speech recognition and natural language processing of the content of audio streams.

Figure 2:
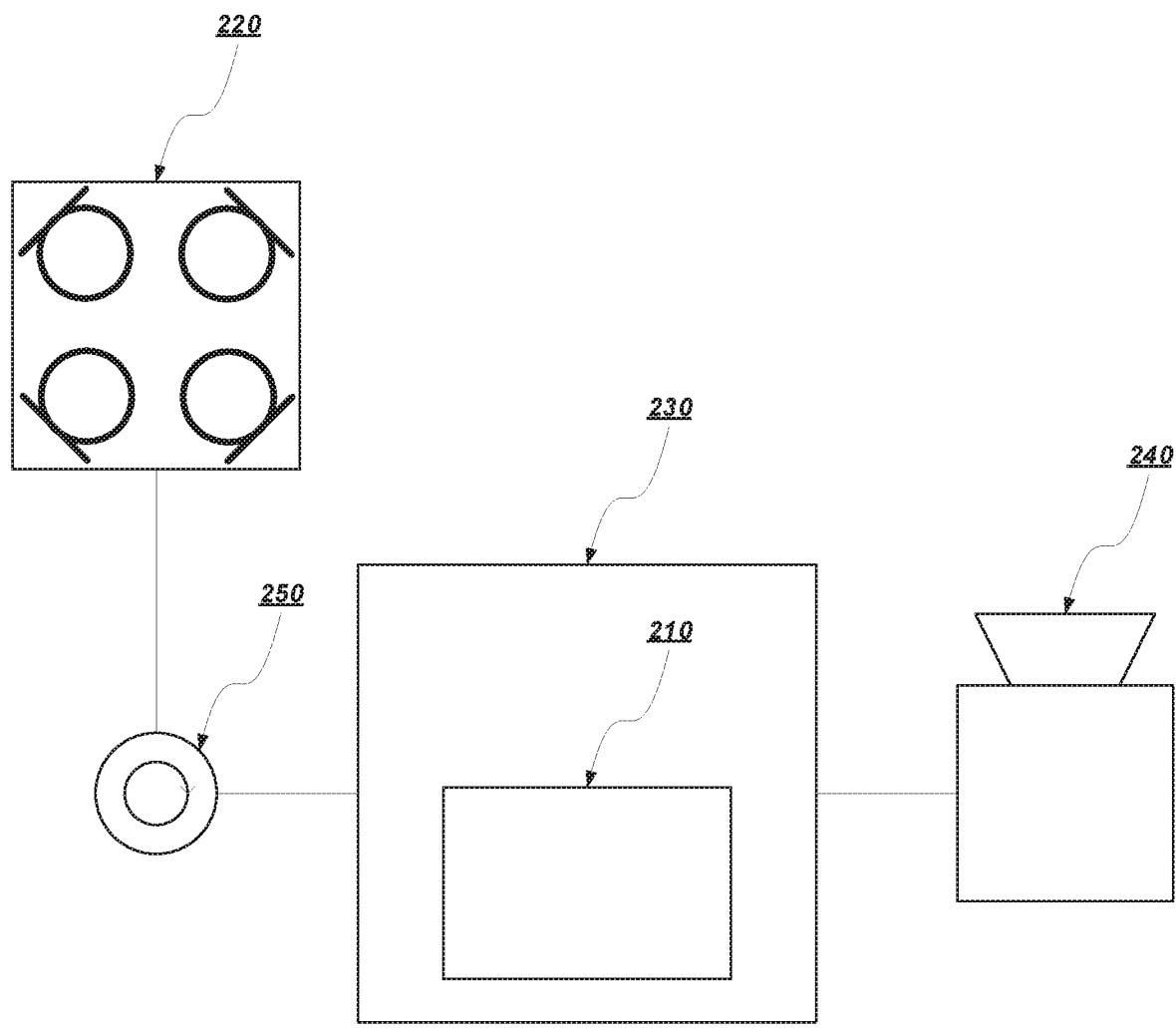
FIG. 2 illustrates components and subsystems of an example robot.

FIG. 2 illustrates components and subsystems of an example robot. In particular, FIG. 2 illustrates electronics 210, a microphone array 220, a robot body 230, a vision subsystem 240, and a microphone array actuator 250.

The robot body 230 provides structural support for the rest of the components and subsystems shown in FIG. 2, i.e., the electronics 210, the microphone array 220, the vision subsystem 240, and the microphone array actuator 250.

Figure 3:
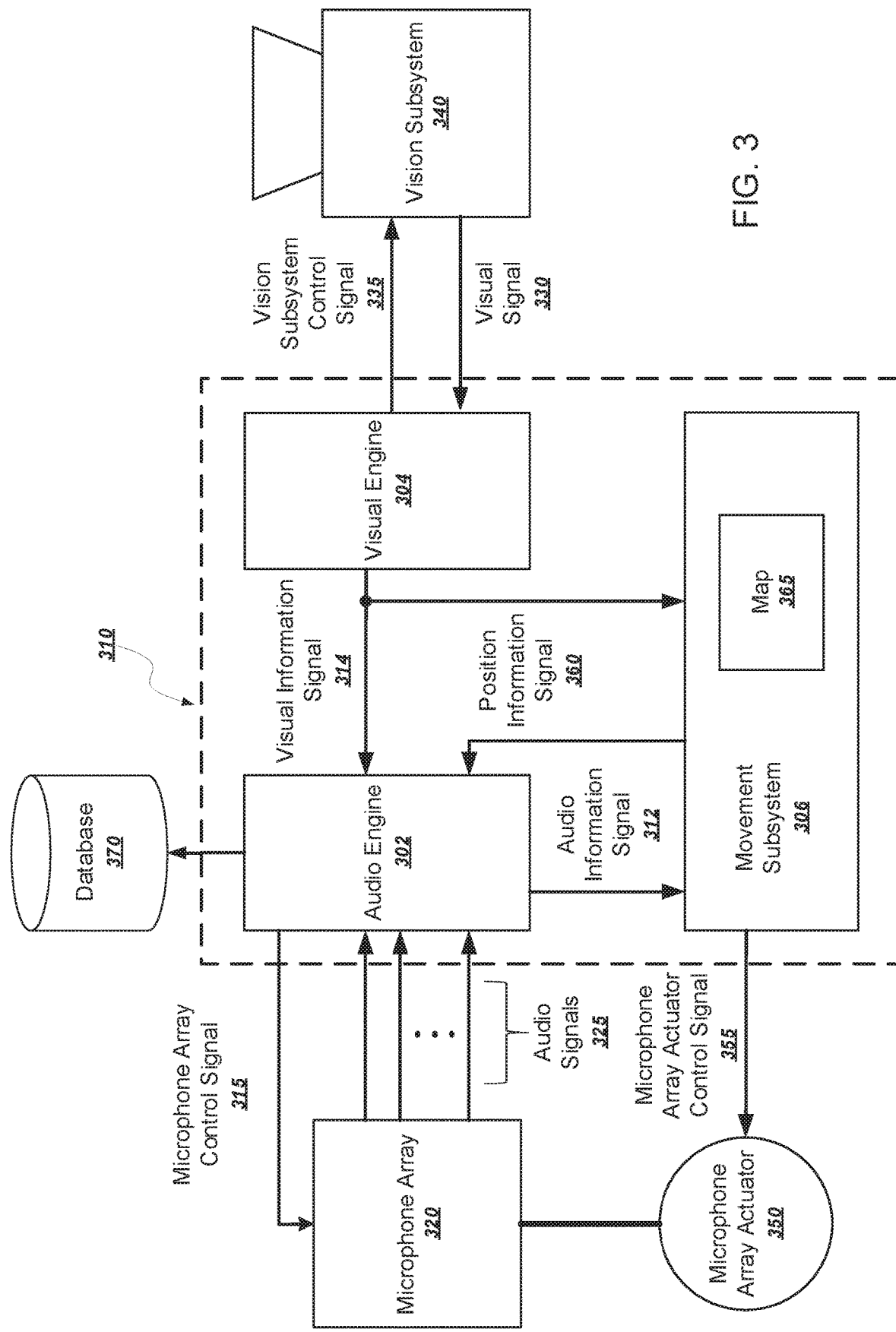
FIG. 3 is a schematic illustrating components, subsystems, and communication signals of an example robot.

Electronics 210 are electrical components whose functionality is discussed in more detail with regard to FIG. 3. When the following components are present, generally electronics 210, the microphone array 220, the vision subsystem 240, and the microphone array actuator 250 are housed inside the robot body 230. In some implementations, the robot body 230 can be designed to allow some or all of these components to be placed on its exterior. When the robot body 230 is connected to a locomotion system, the robot body 230 can move in any appropriate direction. In some implementations, a robot has up to six degrees of freedom: movement in the X, Y, and Z directions, and rotation about the X, Y, and Z axes. Ground-based robots that rely on wheels or treads can generally move in only the X and Y directions of a particular environment, while flying robots or drones and climbing robots or height-adjusting robots can also move in the Z direction.

The microphone array 220 includes a plurality of microphones configured to receive audio input from an environment of a robot. For each microphone of the microphone array 220, the robot can maintain a weight that represents the amount the microphone amplifies a received audio input. The robot can alter the weight of any particular microphone of the microphone array 220 independently of the other microphones in the array. A microphone of the microphone array 220 is activated when it is able to receive audio input in the form of sound waves, convert the audio input into an audio signal, and transmit the audio signal to another component or subsystem of the robot. A microphone of the microphone array 220 is deactivated when one or more of these functions is not available. The plurality of microphones can be directional or omnidirectional microphones. The plurality of microphones can also be a combination of directional and omnidirectional microphones. The robot 100 can activate and deactivate each microphone as described below with reference to FIG. 3.

The vision subsystem 240 includes sensors configured to receive visual input from an environment of a robot. In this example, the robot can use the vision subsystem 240 together with the microphone array 220 to predict a direction of a sound emitter in an environment of the robot. In some implementations, the vision subsystem 240 is omitted from the robot. The sensors of the vision subsystem 240 can be light sensors that detect the intensity of light in an environment of the robot. The vision subsystem 240 can also include more electronically complex sensors including a visible spectrum camera, an infrared camera, and a proximity sensor. The vision subsystem 240 is activated when it is able to receive visual input in the form of electromagnetic radiation, convert the visual input into a visual signal, and transmit the visual signal to another component or subsystem of the robot. The vision subsystem 240 is deactivated when one or more of these functions is not available. The robot 100 can activate and deactivate the vision subsystem 240 as described below with reference to FIG. 3.

The microphone array actuator 250 is a moveable component that can be used to connect the microphone array 220 to the robot body 230. In this example the microphone array actuator 250 can be used to move the microphone array 220. For example, the microphone array actuator 250 can be used to move the microphone array 220 in order to better receive audio input from an environment of the robot. In some implementations, the microphone array actuator 250 is omitted and the microphone array 220 is attached directly to the robot body 230.

FIG. 3 is a schematic illustrating components, subsystems, and communication signals of an example robot. In particular, FIG. 3 illustrates in more detail the functional components of an example implementation of an example robot. The robot includes electronics 310, a microphone array 320, a vision subsystem 340, a microphone array actuator 350, and a database 370. The electronics 310 can be programmed to implement an audio engine 302, a visual engine 304, and a movement control subsystem 306. FIG. 3 also illustrates a number of signals including an audio information signal 312, a visual information signal 314, a microphone array control signal 315, audio signals 325, a visual signal 330, a vision subsystem control signal 335, a microphone array actuator control signal 355, and a position information signal 360.

The audio engine 302 is configured to receive and process audio signals, activate or deactivate the microphones of the microphone array 220, and relay audio information to the movement subsystem 306. The audio engine 302 is also responsible for executing signal processing techniques, e.g., calculating a spatial filter. The audio engine 302 can calculate a spatial filter in order to better receive audio input from an emitter in an environment of the robot 100. One way of constructing a spatial filter is by calculating the weight of each microphone of the microphone array 320. For example, the audio engine 302 can receive audio signals 325 from the microphone array 320, each corresponding to an audio input received by a microphone of the microphone array 320. The audio engine 302 can then process the audio signals 325 to estimate a direction of a sound emitter, or for brevity, an emitter, that produced the received audio input. After estimating the direction of the emitter, the audio engine 302 can calculate an optimal weight to assign each microphone of the microphone array 320. Following this calculation, the audio engine 302 can apply the combination of weights to the audio signals 325 to enhance the audio input received from the emitter.

Audio information can be used to determine a predicted optimal position of the microphone array 320. For example, the audio engine 302 can process the audio signals 325 to estimate information about an emitter present in an environment of the robot. For example, estimated information about the emitter can include, the direction of the emitter, the distance from the emitter to the robot, and the height of the emitter relative to the robot. The audio engine 302 can then communicate the estimated information about the emitter to the movement subsystem 306 via the audio information signal 312. The movement subsystem 306 can estimate an optimal position of microphone array 320 from the estimated information about an emitter. If the movement subsystem 306 estimates that changing the position of the microphone array 320 would improve the reception of audio input from the emitter, then the movement subsystem 306 can communicate a change of position to the microphone array actuator 350 using the microphone array actuator control signal 355. The microphone array actuator 350 is a moveable component that controls the position of the microphone array 320. As previously noted, in some implementations, a microphone array actuator 350 is not present, and the microphone array 320 is unmovable and attached to the robot body 230.

The visual engine 304 is configured to receive and process visual signals, activate and deactivate the vision subsystem 340, and relay visual information to the movement subsystem 306. As previously mentioned, in some implementations, the vision subsystem 340 is omitted from the robot. In these implementations, the visual engine 304 can also be omitted from the robot. FIG. 3 illustrates an example in which the vision subsystem 340 is included in the subsystems of the robot. The visual engine 304 controls the vision subsystem 340 using the visual control signals 335. For example, the visual engine 304 can determine whether the vision subsystem 340 is activated by using the vision subsystem control signal 335. When the vision subsystem 340 is activated, the vision subsystem 340 can transmit the visual signal 330 to the visual engine 304. The visual engine 304 can process the visual signal 330 in order to extract visual information about an environment of the robot, e.g., the amount of light, the presence of objects, and the topography of the environment, to name just a few examples.

The visual engine 304 can also process visual input to estimate information about an emitter present in the environment of robot. For example, estimated information about the emitter can include, the direction of the emitter, the distance from the emitter to the robot, and the height of the emitter relative to the robot. The visual engine 304 can communicate this information to the audio engine 302 using the visual information signal 314. Audio engine 302 can use the information together with, or instead of, the audio input received by the microphone array 320 to estimate a direction of an emitter. After estimating a direction of an emitter, the audio engine 302 can calculate a predicted optimal weight to assign each microphone of the microphone array 320. Following this calculation, the audio engine 302 can apply the combination of weights to the audio signals 325 to enhance the audio input received from the emitter.

Not only can the movement subsystem 306 use audio input processed by the audio engine 302 to estimate an optimal position of the microphone array 320, the movement subsystem 306 can similarly use visual input. The visual engine 304 can process the visual signal 330 to estimate information about an emitter present in an environment of the robot. For example, estimated information about the emitter can include, the direction of the emitter, the distance from the emitter to the robot, and the height of the emitter relative to the robot. The visual engine 304 can then communicate the estimated information about the emitter to the movement subsystem 306 using the visual information signal 314. The movement subsystem 306 can process the estimated information to estimate an optimal position of the microphone array 320. In response to estimating an optimal position of the microphone array 320, the movement subsystem 306 can change the position of the microphone array 320 by relaying the estimated optimal position to the microphone array actuator 350 using the microphone array actuator control signal 355. The movement subsystem 306 can also estimate a predicted optimal position of the microphone array 320 by using both the audio input and the visual input together.

In addition to using audio input and visual input to estimate a direction of an emitter, the robot can use an auxiliary sensor to perform the same task. The robot can receive a wireless communication from the auxiliary sensor indicating the presence of a sound emitter. The robot can then determine the direction of the auxiliary sensor, for example, from information received from the auxiliary sensor indicating its position. From the direction of the auxiliary sensor, the robot can estimate a direction of the emitter, and, using this estimate, calculate a spatial filter as described above. As an example, the auxiliary sensor could be a home security sensor configured to detect the opening of a door, glass breaking, or motion, and relay this detection to the robot.

The movement subsystem 306 is also configured to record information corresponding to the movement of the robot. The movement subsystem 306 can then process this information and relay it to the audio engine 302, which can use the information to alter the weights of each microphone of the microphone array 320. For example, the audio engine 302 can calculate a spatial filter in the direction of an emitter present in an environment of the robot by calculating the weights of each microphone of the microphone array 320. After calculating the spatial filter, the robot can then change position. Because of the change in position, the spatial filter may no longer be aligned with the emitter, resulting in less-than-optimal reception of audio input. The movement subsystem 306 can record information corresponding to the previous change in position and can relay this information to the audio engine 302 using the position information signal 360. The audio engine 302 can use the difference between the final and initial positions to recalculate the spatial filter before receiving audio input while in the final position. This way, the robot can realign the spatial filter with the direction of the emitter after a change in position.

Prior to a change in position, the robot can also communicate information relating to the change in position to the movement subsystem 306. From this information, the movement subsystem 306 can estimate a final position of the robot. The movement subsystem 306 can then control the actuation of microphone array 320 before or during the change of position of the robot. In this way, the microphone array 320 can already be in a predicted optimal position for receiving audio input when robot arrives at the final position.

The movement subsystem 306 can also store a map 365. The map 365 is a map of an environment of the robot 100 that includes areas accessible to, and inaccessible to the robot. The map 365 could be a two-dimensional map or a three-dimensional map. The map 365 can be uploaded to movement subsystem 306, for example, by a user. The robot 100 can also generate the map as described in greater detail below with reference to FIG. 5A.

The robot 100 is also able to localize itself, i.e., determine its location on the map. The audio engine 302 can use the map 365, in addition to the audio signals received from the microphone array 320, to assist in the prediction of a direction of a sound emitter. The robot 100 can eliminate a possible direction of the source of the sound (the sound emitter) from consideration by determining that the probability of there being a sound emitter in that direction is lower than a certain threshold value. For example, if the robot 100 is close to an object, such as a wall, and it receives a sound wave coming from the direction of the wall, e.g. a reflection of the sound wave off the wall, it can determine that the sound emitter cannot be physically located in the direction of the wall, and must instead be a reflection of the sound wave off the wall.

After detecting the presence of an object, the robot 100 can also move relative to the object. For example, the robot 100 can detect the presence of a chair. In response, the robot 100 can move relative to the chair to improve the reception of input from its sensor subsystems, e.g. the microphone array 220 or the vision subsystem 240.

Figure 4:
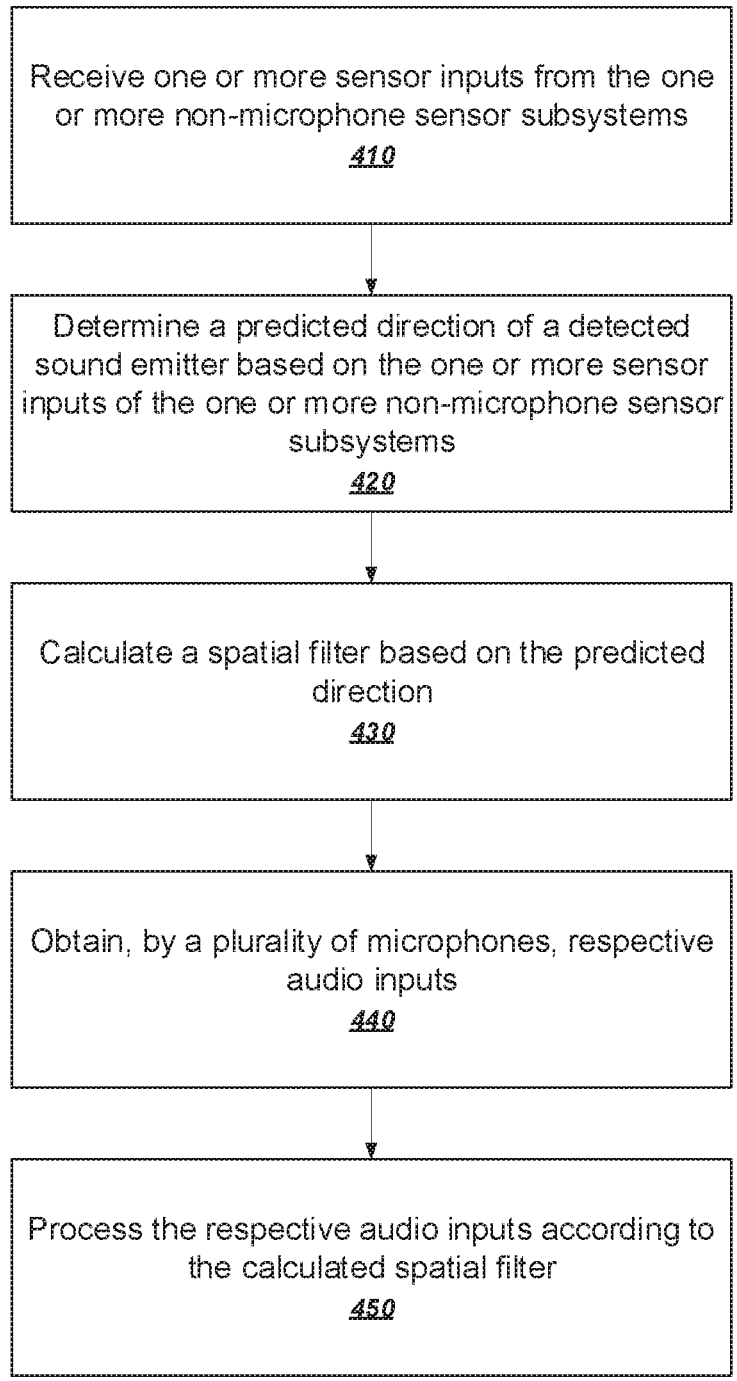
FIG. 4 is a flowchart of an example process for calculating a spatial filter.

FIG. 4 is a flowchart of an example process for calculating a spatial filter. The example process will be described as being performed by a robot having a plurality of microphones and one or more other sensor subsystems and programmed appropriately in accordance with this specification. For example, when appropriately programmed, the robot 100 can perform the example process.

The robot receives one or more sensor inputs from one or more non-microphone sensor subsystems (410). In other words, instead of or in addition to receiving sensor inputs from the microphones, the robot can obtain sensor inputs using any appropriate combination of the other sensor subsystems described above. For example, the vision subsystem can generate a color image of the environment, while a microphone array can obtain audio input in order to detect the presence of a sound emitter in the environment.

The robot determines a predicted direction of a detected sound emitter based on the one or more sensor inputs of the one or more non-microphone sensor subsystems (420). An audio engine can process the audio signals received from the microphone array in order to predict a direction of an emitter. For example, the robot can determine the direction of a sound emitter by comparing the audio input received by each microphone of a microphone array. Similarly, a visual engine can process the visual signals received from a vision subsystem in order to predict a direction of an emitter. For example, the robot can determine the direction of a sound emitter by detecting the face of a human using the vision subsystem. In some implementations, the robot can also account for velocity and orientation changes to generate the prediction. For example, if the robot is turning or driving at a particular speed, the robot can predict its next location and update the predicted direction of the detected sound emitter based on the predicted next location.

If the robot changes orientation from an initial orientation to a final orientation, the predicted direction of the detected sound emitter may no longer be accurate, relative to the final orientation. After the robot has determined the predicted direction, the robot can update the predicted direction following a change in orientation of the robot. For example, if the robot changes its orientation by rotating, the robot can update the predicted direction so that the updated predicted direction accounts for the change in orientation.

In some implementations, the robot can use the the predicted direction to change the position of the plurality of microphones. Using a microphone array actuator, the robot can change the position of the plurality of microphones to better receive audio input from the predicted direction.

The robot generates a spatial filter based on the predicted direction (430). To achieve this, the audio engine can calculate a weight for each microphone of the microphone array. The weights are calculated in order to enhance the reception of audio input from the predicted direction. The calculated weights also serve to diminish the reception of audio input not in line with the predicted direction. The combination of weights calculated to selectively enhance audio from a particular direction constitutes the calculated spatial filter. The calculated spatial filter and the robot's location can also be added to a database of signal processing information.

If the robot moves from an initial location to a final location, the calculated spatial filter used to process audio received at the initial position may not be optimal for processing audio received at the final position. In some embodiments, the robot can determine a distance to the sound emitter from the robot and use the distance in part, to update the generated spatial filter following a change in location of the robot. After determining the distance to the sound emitter, the robot can use this information, along with the predicted direction, to update the generated spatial filter following a change in location or a change in location and orientation of the robot.

The robot can determine its distance to the sound emitter in a number of ways. For example, the robot can use a distance sensor to determine the distance to the sound emitter.

As another example, the robot can determine the distance to the sound emitter using a camera. In one example embodiment, a camera can detect a person's face and determine that the person is a sound emitter. After detecting the person's face, a visual engine of the robot can process the image of the person's face to determine the robot's distance to the person.

As yet another example, a pair of robots can determine a location of the sound emitter, relative to each robot, using triangulation. Either or both of the robots can perform the calculations necessary to determine the location of the sound emitter through triangulation, so long as the two robots are communicatively coupled. A first robot and a second robot can each determine a respective orientation relative to the sound emitter. Each robot can also determine its location with respect to the other robot. The first robot can then receive the location and orientation from the second robot. Using the two locations and two orientations, the first robot can triangulate the location of the sound emitter. In some implementations, the robot can also update the map corresponding to its environment to include the location of the sound emitter.

The robot obtains, by the plurality of microphones, respective audio inputs (440). Each microphone of the microphone array receives a different audio input by virtue of its unique position relative to the emitter. Each microphone obtains its respective audio input and converts the audio input into a separate audio signal. The audio signals are then sent to the audio engine. In other embodiments, the robot can receive audio inputs from one or more accessory input subsystems. For example, an accessory input subsystem can be an accessory microphone array or integrated microphones of a mobile device. The accessory input subsystem can be configured to obtain audio input, convert the audio input into one or more audio signals, and transfer each audio signal to the robot.

The robot processes the respective audio inputs according to the calculated spatial filter (450). The respective audio inputs are encoded by audio signals that are processed by the audio engine. The audio engine applies the combination of weights determined in stage 430, to the audio input of each microphone of the microphone array to selectively amplify each of the audio signals. In addition, the audio engine also time-shifts the audio signals so that all signals are in phase. Time-shifting and selectively amplifying the weights enhances the audio input received in the direction of the emitter.

The robot can use the processed audio for a number of applications.

For example, the audio signal can correspond to a user providing a voice command to the robot, and by processing the audio signal using the above-mentioned spatial filtering techniques, the robot can increase the probability that the command provided by the user will be recognized correctly. As another example, the robot can be configured to detect and report the occurrence of particular sounds, e.g., the sound of glass breaking or a knock at a door, the sound of another robot, of a siren, or any sound that would be useful to localize. By using the above-mentioned spatial filtering techniques, the robot can decrease false positive and false negative detections while increasing the probability of true positive detections.

Figure 5A:
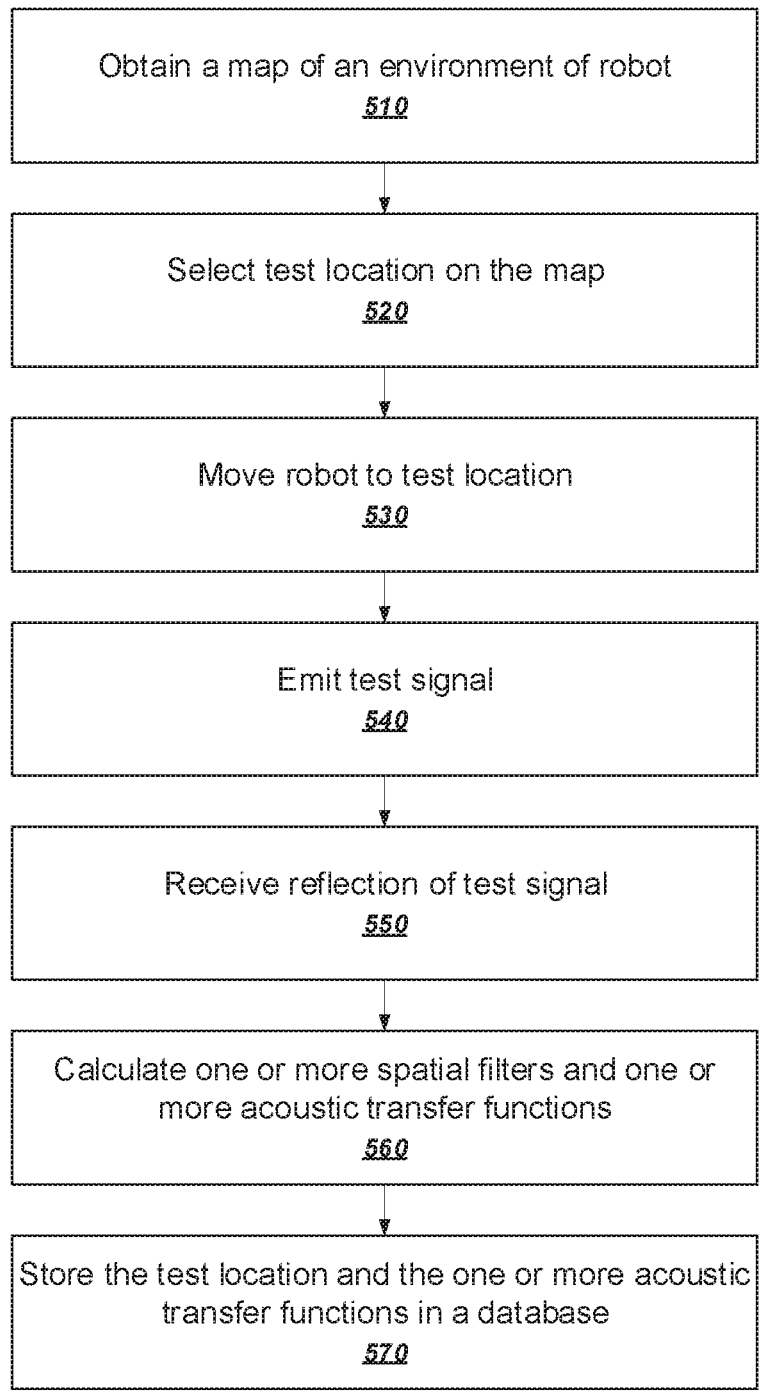
FIG. 5A is a flowchart of an example process for calculating and storing one or more spatial filters and one or more acoustic transfer functions.

FIG. 5A is a flowchart of an example process for generating and storing one or more spatial filters and one or more acoustic transfer functions. As discussed, a robot can calculate a spatial filter in response to a detected sound in order to optimize the reception of that sound. A mobile robot can also automatically generate transfer functions within its environment to further optimize signal processing of received sounds. The process will be described as being performed by a robot programmed appropriately in accordance with this specification. When appropriately programmed, the robot 100 can perform the example process.

The robot obtains a map of an environment of the robot (510). For example, the robot can generate the map by traversing an area accessible to the robot while recording the robot's location. The robot can also detect the location of any inaccessible areas. The environment can be indoors or outdoors. The environment can be an enclosed indoor area, e.g., a house or an apartment, an office floor, or a warehouse interior.

The robot can use a vision subsystem to infer that certain areas are inaccessible. For example, the robot can recognize an object, a wall, or a staircase using the camera and infer that these areas are inaccessible. Upon determining that an area is inaccessible, the robot can record the locations and boundaries of inaccessible areas. Using this information, the robot can use a movement subsystem to automatically construct a map. For example, the robot can use any appropriate mapping algorithm to sufficiently explore accessible areas in its environment in order to generate a sufficiently detailed map of its environment. In some implementations, the robot can construct the map using LIDAR or other active emitter tracking technologies.

Alternatively, or in addition, the map can be generated in whole or in part by other systems and uploaded to the robot, for example, by a user or as generated by another robot or by a camera, e.g., the video capable camera in a smartphone.

The robot selects a test location on the map (520). The test location corresponds to a location at which the robot will emit and receive a test signal in order to generate a spatial filter and acoustic transfer function. The robot can select the test location in a number of ways. In some implementations, the robot determines a test location from an area of the environment that has a low density of locations having associated transfer functions.

The robot moves to the test location (530). After doing so, the robot emits a test signal (540). Examples of possible test signals include, a frequency sweep, a series of tones, and a series of impulses.

The robot receives a reflection of the test signal (550). The test signal propagates through the environment of the robot and can reflect off objects in the environment. Specifically, the robot receives a reflection of the test signal that has been distorted due to the acoustic properties of the environment. It should be noted that the robot can receive one or more reflections of the test signal in one or more directions, depending on how the test signal reflects off the objects in the environment.

The robot calculates one or more spatial filters and one or more acoustic transfer functions (560). In response to receiving a reflection of the test signal, the robot can calculate one or more spatial filters in order to determine from which direction the reflection originated. Thus, the robot can calculate a respective spatial filter for each of the one or more reflections of the test signal.

For each computed spatial filter, the robot can calculate a corresponding acoustic transfer function that represents the relationship between the distorted and original versions of the test signal. In other words, the robot can use the one or more calculated acoustic transfer functions to represent the effect of the environment on the test signal.

The robot stores the test location and the one or more acoustic transfer functions in a database (570). In other words, for a particular location and each of one or more directions, the robot can store a respective transfer function representing how an audio signal received from a particular direction is transformed by the environment of the robot.

The robot can also record an indication that a location in the environment has already been tested. The robot can then select a new test location and repeat the process to generate additional transfer functions. In some implementations, the robot performs the process continually as it explores the environment. Because transfer functions are typically not significantly different for small differences in testing locations, the robot need not even stop moving to perform the subsequent tests. For inaccessible locations within the map, the robot can also prompt a user to place it at certain locations within the environment. The robot can determine to do so only when nearby users are actually detected.

To further enhance this process, the robot can store the received test signals and compute the transfer functions later. Alternatively or in addition, the robot can upload the received test signals to a nearby or remote computing device, which can handle generating the transfer functions.

The above process assumed the presence of only a single robot. However, multiple devices can also be used to enhance the quality of the transfer functions. For example, one robot or another device can act as a sound emitter, while another robot can act as the sound receiver. An emitter can be any device configured to output a test signal, and transmit, to the robot, information related to the test signal. The other device can also be a mobile phone, a desktop computer, or a dedicated stationary sound emitter. In these situations, the robot can determine two test locations: the first being an emitting location and the second being a receiving location. In these implementations, the robot can position itself at the receiving location, while the emitter is positioned at the emitting location. Thus, for example, the other emitter can be another robot, a mobile phone, a desktop computer, or another mobile device.

Figure 5B:
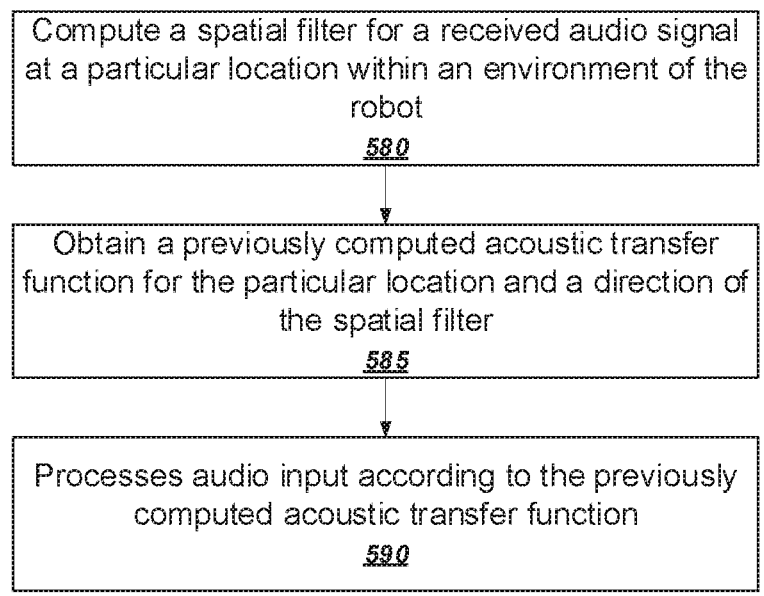
FIG. 5B is a flowchart of an example process for using transfer functions to enhance audio signals.

FIG. 5B is a flowchart of an example process for using transfer functions to enhance audio signals. The process will be described as being performed by a robot programmed appropriately in accordance with this specification. When appropriately programmed, the robot 100 can perform the example process.

The robot computes a spatial filter for a received audio signal at a particular location within an environment of the robot (580). As previously described above with reference to FIG. 4, the robot can compute a spatial filter for an audio signal with or without actually receiving an audio input. For example, if the robot detects the presence of a user in a particular direction, the robot can compute a spatial filter in the direction of the user in anticipation that the user may provide a voice command.

The robot obtains a previously computed acoustic transfer function for the particular location and a direction of the spatial filter (585). For example, the robot can use the particular location to determine a nearest test location stored in the database of transfer functions. The robot can then obtain the transfer function associated with the stored test location. If none of the test locations in the database are sufficiently close to the current location of the robot, the robot can decline to use a previously generated transfer function.

The robot processes audio input according to the previously computed acoustic transfer function (590). In other words, the robot can use the previously computed acoustic transfer function to remove the effects of distortion of the environment on the received audio input. The robot can thus generate a recovered audio signal that is closer to the audio signal generated by the sound emitter.

Figure 6:
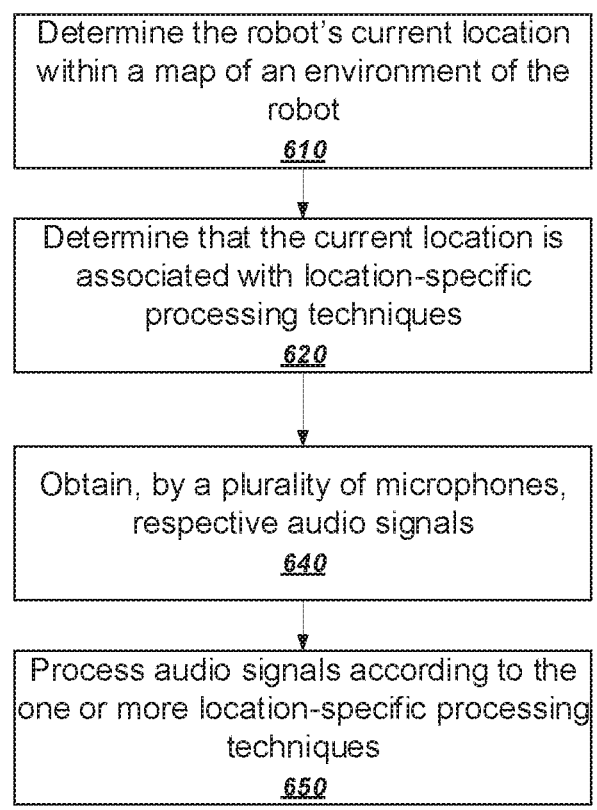
FIG. 6 is a flowchart of an example process for using a map to enhance audio processing.

FIG. 6 is a flowchart of an example process for using a map to enhance audio processing. As discussed above, a robot can calculate a spatial filter in response to a detected sound in order to optimize the reception of that sound. The process will be described as being performed by a robot programmed appropriately in accordance with this specification. When appropriately programmed, the robot 100 can perform the example process.

The robot determines its current location within a map of an environment of the robot (610). As previously discussed, the map can be stored on a memory unit of the robot. The map can indicate the locations of one or more previously-calculated transfer functions and one or more previously-calculated spatial filters.

The robot determines that its current location within the map is associated with location-specific processing techniques (620). In general, the location-specific processing techniques embody reasoning about how audio signals are predicted to travel in the robot's environment. The location-specific processing techniques associated with the robot's current location can include using location-specific spatial filters, object-specific transfer functions, or both.

As one example, if the robot is near a wall, it is likely the robot will pick up reflected sound waves. Therefore, if according to the map, the robot is within a threshold distance to a wall, the robot can use a location-specific spatial filter that enhances the audio signals from both the reflected and non-reflected versions of the sound waves. In other words, rather than disregarding the audio signals received in the direction of the wall, these reflected audio signals are used to boost the audio signal coming from the direction of the emitter. As another example, if the robot is in or near a hallway, where sounds are likely to travel only in two directions, the robot can use a location-specific spatial filter that enhances audio signals from one or the other direction and ignores all other signals.

As another example, the robot can use its current location to determine that it is in a dynamic area of the map that requires special processing. Dynamic areas are areas that are likely to change in significant ways from time to time. For example, the location data can determine that the robot is near a door. Doors are dynamic areas because whether or not a door is closed greatly affects how sound waves travel in the environment.

Therefore, if the location data indicates that the robot is near a door, the robot can detect whether the door is open or closed. The robot can then use an object-specific transfer function for a closed door or an open door.

These object-specific transfer functions may have been previously generated during the testing process. For example, the robot can generate one object-specific transfer function that accounts for the door being open and a separate object-specific transfer function that accounts for the door being closed.

As another example, the location data can indicate that the robot is in an area in which chairs are located. Chairs are frequently moved around and are thus not always in the same places. And even if the robot has a transfer function for a particular location, the audio signal can still be improved with an object-specific transfer function in the case that a chair is recognized.

Therefore, if the location data indicates that the robot is in an area in which chairs are routinely located, the robot can first perform object detection to determine the presence of chairs in the environment. If a chair is detected in the direction corresponding to an active spatial filter, the robot can obtain an object-specific transfer function that accounts for how the chair distorts the audio signal.

The robot obtains, by a plurality of microphones, respective audio signals (640). As previously discussed, the robot can obtain audio input from its environment using a plurality of microphones. In other embodiments, the robot can use one or more accessory input subsystems to receive audio input.

The robot processes the audio signals using one or more of the location-specific processing techniques (650). The robot can determine which of the location-specific techniques is most relevant to its location, and use the determined location-specific techniques to process the audio signals. For example, the robot can determine which state (i.e., open or closed) that the door is most likely in. After this determination, the robot can process received audio signals using the object-specific transfer function that corresponds to the door's state.

Figure 7:
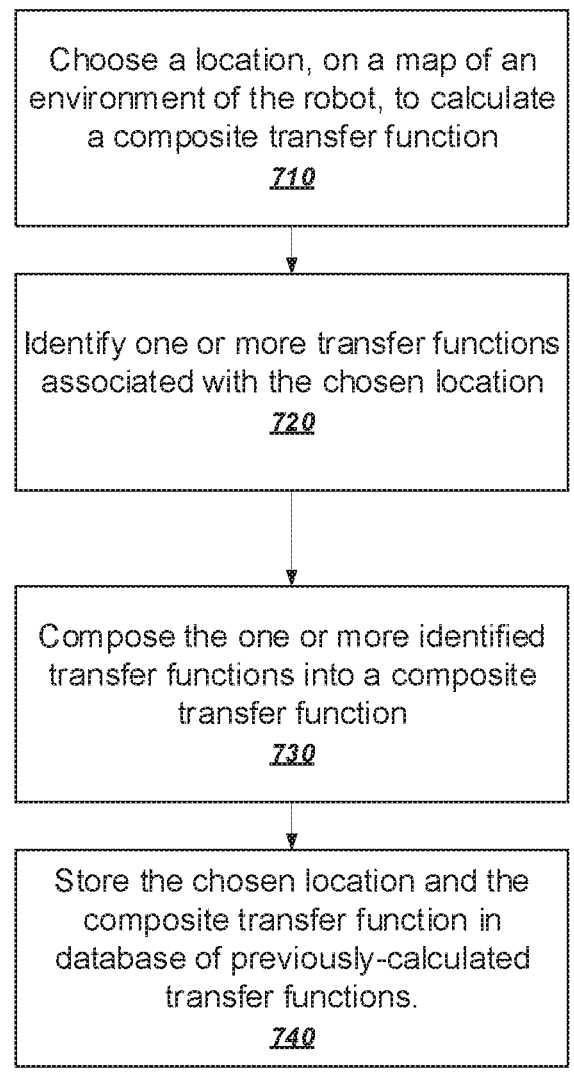
FIG. 7 is a flowchart of an example process for calculating a composite transfer function at a chosen location based one or more pre-calculated transfer functions.

FIG. 7 is a flowchart of an example process for calculating a composite transfer function at a chosen location based on one or more pre-calculated transfer functions. As previously discussed, the robot can store a map that includes the locations where it calculated the one or more previously-calculated transfer functions. The robot can also access a database that includes the previously-calculated transfer functions. When appropriately programmed, the robot 100 can perform the example process.

The robot chooses a location, on a map of an environment of the robot, to calculate a composite transfer function (710). In general, the location can be any location on the map. As an example, the chosen location can be one where there is no corresponding transfer function location stored on the map. In other implementations, the location can be chosen by a user.

The robot identifies one or more transfer functions associated with the chosen location (720). The robot can determine, from the map, the locations associated with the one or more previously-calculated transfer functions and determine which locations are closest to the chosen location.

In some implementations, the transfer functions can include object-specific transfer functions as described above. The one or more object-specific transfer functions can correspond to one or more transfer functions calculated near an identified object. In addition, the one or more object-specific transfer functions can correspond to one or more transfer functions calculated near an object similar to the identified object. For example, if the chosen location is near a first window, the robot can use a transfer function calculated near the first window, or a transfer function calculated near a second window.

The robot composes the one or more identified transfer functions into a composite transfer function (730). Using signal processing techniques, the robot can compose the transfer functions into a single, composite transfer function that includes features of the one or more transfer functions.

The robot stores the chosen location and the composite transfer function in the database of previously-calculated transfer functions (740).

For example, the map can include locations associated with a transfer function calculated at a first location and a transfer function calculated near a first wall. The robot can also include a database that includes these transfer functions. The robot can choose a second location, nearby the first location and a second wall, at which to calculate a composite transfer function. The robot can use the map to identify the location of the transfer function calculated at the first location. The robot can also use the map to identify the location of the transfer function calculated near the first wall. The robot can retrieve from the database the transfer functions that correspond to the two identified locations. The robot can compose the transfer function calculated at the first location and the transfer function calculated near the first wall into a single, composite transfer function, which can then be stored in the database.

In other embodiments, the robot can calculate a degree of similarity between an area surrounding a first object (e.g., the first wall) and an area surrounding a second object (e.g., the second wall). If the two areas meet a certain threshold degree of similarity, then the robot can choose to use the transfer function associated with the second object towards calculating a composite transfer function. If the two areas do not meet a certain threshold degree of similarity, then the robot can reject the second object and not use it towards calculated a composite transfer function.

In the previous examples, the robot forms a composite transfer function for a chosen location using one transfer function calculated at a location near the chosen location and one object-specific transfer function calculated close to an object that is similar to one near the chosen location. The robot can also use multiple transfer functions calculated at multiple locations near the chosen location, as well as multiple object-specific transfer functions that correspond to an object near the chosen location. When the robot identifies multiple transfer functions to be used towards calculating a composite transfer function, the robot can use a weighing scheme that determines which transfer functions are most relevant given the chosen location.

For example, if the map indicates that there are transfer functions calculated at two locations close to the chosen location, then the weighting scheme can assign the closer of the two locations a greater weight. When calculating the composite transfer function, an audio engine of the robot can prioritize a transfer function with a greater weight so that the composite function is more similar to that transfer function. The robot can also use a weighing scheme when prioritizing more than one object-specific transfer function.

It should be noted that, in some scenarios, the robot determines that there is not an object within a certain distance to the chosen location. In this case, the process can omit stages 730 and 740. The robot then composes the one or more identified transfer functions to form the composite transfer function.

A robot can use a database of transfer functions to enhance its ability to receive audio within its environment. For example, after computing a sufficiently large number of transfer functions between pairs of points in the environment of the robot, a preferred acoustic location within the environment of the robot can be computed. The preferred acoustic location is a location within the environment of the robot that improves the aggregate quality of sound received by the robot. The preferred acoustic location can be computed by the robot itself, although because such processing can be computationally intensive, a cloud-based computing system providing online support services for the robot can be used alternatively or in addition to the robot.

For example, from a database of transfer functions, a number of sound origins can be selected. The selected sound origins are locations from which it is important for the robot to be able to clearly detect sound. Thus, the sound origins can be defined as peripheral locations of the environment of the robot or locations that sound is likely to be detected from, e.g., entryways, windows, and pet doors, to name just a few examples.

Next, a number of candidate locations within the environment can be selected. Each candidate location is a candidate preferred acoustic location for the robot. In some implementations, the system selects sound origins and candidate locations according to origin/destination pairs associated with each of the transfer functions. However, if the robot has the capability of computing composite transfer functions between any arbitrary pair of locations within its environment, the robot can select the sound origins and candidate locations in other ways. For example, the robot can define a grid of locations within the environment of the robot and consider each grid location as a candidate location.

Each candidate location can then be evaluated according to transfer functions between the candidate location and each of the selected sound origins. To do so, the transfer function between a particular sound origin and the candidate location can be used to compute an origin score. The origin score represents a decrease in sound quality of a sound wave propagating from the selected sound origin to the candidate location according to the associated transfer function. The decrease in sound quality can represent a measure of volume change, a measure of distortion, both, or some other measure of sound quality.

An aggregate score for the candidate location can then be computed from the individual origin scores. As described above, the aggregate score for a candidate location represents the aggregate quality of sound of sounds received by the robot while positioned at the candidate location. The aggregate quality of sound can be defined in a number of different ways. For example, the aggregate quality of sound can reflect that as many selected sound origins as possible should have at least threshold predicted sound quality at the candidate location. In other words, the aggregate quality of sound can impose a penalty for any sound origins that are at location from which sound is unlikely to be processed reliably. In some other implementations, the system can compute a weighted average of all the origin scores. For example, the weight for each origin score can be based on a confidence score computed when the transfer function was generated by the robot.

The preferred acoustic location can then be selected as the candidate location having the highest aggregate score. At that point, the robot can be expected to improve its ability to process audio in its environment, so the robot can navigate to the preferred acoustic location and wait to receive sounds. Not only can the robot navigate to the preferred acoustic location but it can also determine at least one of a pose and orientation in order to improve its ability to process audio of interest. Assuming a robot includes one or more independently movable components, a pose for the robot can include actuating at least one of those components relative to the other components to establish a relative position and orientation of the components. For example, if the robot has a microphone on the right side of its head, it may rotate its head to place the microphone in the direction of interest.

In some implementations, this navigation action occurs in response to a idle time event. In other words, when the robot runs out of things to do, the robot can navigate to the preferred acoustic location to improve the likelihood of processing any unexpected sounds. The idle time event can be a lack of user interaction for at least a threshold period of time, the failure to detect any nearby users, or an explicit command or trigger from a user. For example, a user can select an option that causes the robot to navigate to the preferred acoustic location at the same time each morning, e.g., the time at which the user normally departs for work.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively, or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program which may also be referred to or described as a program, software, a software application, an app, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions. For a robot to be configured to perform particular operations or actions means that the system has installed on it software, firmware, hardware, or a combination of them that in operation cause the robot to perform the operations or actions.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a robot, a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and pointing device, e.g., a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can, in some cases, be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results.

What is claimed is:

1. A robot comprising:
   a body and one or more physically moveable components;
   a plurality of microphones;
   one or more processors; and
   one or more storage devices storing instructions that are operable, when executed by the one or more processors, to cause the robot to perform operations comprising:
      obtaining map data of an environment of the robot;
      selecting a test location from the map data;
      navigating to the selected test location;
      receiving a test signal of a sound wave propagating through the environment of the robot;
      computing one or more acoustic transfer functions for the test signal, wherein each acoustic transfer function represents how the test signal was transformed by the environment of the robot while the sound wave propagated through the environment of the robot; and
      storing each of the transfer functions in association with the test location.

2. The robot of claim 1, wherein the operations further comprise:
   receiving, by the robot, an original audio signal at a particular location in the environment of the robot;
   obtaining one of the previously computed acoustic transfer functions associated with the particular location; and
   computing a recovered audio signal by applying the previously computed acoustic transfer function for the particular location to the received original audio signal.

3. The robot of claim 2, wherein obtaining one of the previously computed acoustic transfer functions associated with the particular location comprises determining a previous test location that is closest in the environment of the robot to the test location.

4. The robot of claim 1, wherein the operations further comprise:
   repeatedly and automatically selecting new test locations in the environment of the robot;
   computing one or more additional acoustic transfer functions for each new test location; and storing each additional acoustic transfer function in association with each respective new test location.

5. The robot of claim 4, wherein selecting a new test location comprises:
  computing, for each of a plurality of areas in the environment of the robot, a respective measure of density of previously tested locations; and
  selecting a particular location in an area of the environment having a density that satisfies a threshold.

6. The robot of claim 1, wherein the test signal is emitted by the robot.

7. The robot of claim 1, wherein the test signal is emitted by a different second robot or a stationary sound emitter.

8. A robot comprising:
  a body and one or more physically moveable components;
  a plurality of microphones;
  one or more processors; and
  one or more storage devices storing instructions that are operable, when executed by the one or more processors, to cause the robot to perform operations comprising:
    determining a current location of the robot in an environment of the robot;
    determining that the current location is associated with one or more location-specific audio processing techniques;
    obtaining, by the plurality of microphones, respective audio signals of sound waves propagating in the environment of the robot; and
    processing the audio signals according to the one or more location-specific audio processing techniques.

9. The robot of claim 8, wherein the one or more location-specific audio processing techniques comprise a location-specific acoustic filter.

10. The robot of claim 9, wherein determining that the current location of the robot is associated with one or more location-specific audio processing techniques comprises determining that the current location of the robot is within a threshold distance of a wall in the environment of the robot, and
  wherein the location-specific acoustic filter amplifies audio signals of sound waves reflecting off the wall.

11. The robot of claim 9, wherein determining that the current location of the robot is associated with one or more location-specific audio processing techniques comprises determining that the current location of the robot is in a hallway of the environment of the robot, and
  wherein the location-specific acoustic filter amplifies audio signals of sound waves traveling along the hallway.

12. The robot of claim 8, where the one or more location-specific audio processing techniques comprise a location-specific acoustic transfer function.

13. The robot of claim 12, wherein determining that the current location of the robot is associated with one or more location-specific audio processing techniques comprises determining that the current location of the robot is in a dynamic area having obstacles that are likely to change orientation, and
  wherein the location-specific acoustic transfer function is an object-specific transfer function that represents how sound waves are transformed by a particular object.

14. The robot of claim 13, wherein the object-specific transfer function represents how sound waves are transformed by a closed door or an open door.

15. The robot of claim 13, wherein the object-specific transfer function represents how sound waves are transformed by furniture in the environment of the robot.

16. A robot comprising:
  a body and one or more physically moveable components;
  a plurality of microphones;
  one or more processors; and
  one or more storage devices storing instructions that are operable, when executed by the one or more processors, to cause the robot to perform operations comprising:
    receiving, by the robot, one or more audio signals at a particular location in an environment of the robot;
    selecting, based on the particular location of the robot, a plurality of precomputed acoustic transfer functions from a database of acoustic transfer functions that associates each acoustic transfer function with a respective location in the environment of the robot;
    computing a single composite acoustic transfer function from the plurality of selected acoustic transfer functions; and
    processing the received one or more audio signals using the composite acoustic transfer function.

17. The robot of claim 16, wherein selecting the plurality of precomputed acoustic transfer functions comprises determining which acoustic transfer functions are associated with locations in the environment that are closest to the location of the robot.

18. The robot of claim 16, wherein computing a single composite acoustic transfer function from the plurality of selected acoustic transfer functions comprises assigning a respective weight to each acoustic transfer function based on a respective distance between a location associated with the acoustic transfer function and the particular location of the robot.

19. The robot of claim 16, wherein the acoustic transfer functions in the database of acoustic transfer functions are precomputed by the robot moving to multiple locations within the environment of the robot.

20. The robot of claim 19, wherein the operations further comprise:
  generating the database of acoustic transfer functions, including repeatedly performing operations comprising:
    selecting a test location from map data of the environment of the robot,
    navigating to the selected test location,
    receiving a test signal of a sound wave propagating through the environment of the robot,
    computing one or more acoustic transfer functions for the test signal, wherein each acoustic transfer function represents how the test signal was transformed by the environment of the robot while the sound wave propagated through the environment of the robot, and
    storing each of the transfer functions in association with the test location in the database.

21. The robot of claim 16, wherein the test signal is emitted by the robot.

22. The robot of claim 16, wherein the test signal is emitted by a different second robot or a stationary sound emitter.

23. A system comprising:
  one or more computers and one or more storage devices storing instructions that are operable, when executed by the one or more computers, to cause the one or more computers to perform operations comprising:

receiving data representing a plurality of transfer functions that each represents how a sound wave was transformed by the environment of a robot while the sound wave propagated from a respective sound origin in the environment of the robot to a respective sound destination in the environment of the robot;

selecting a plurality of sound origins associated with one of the plurality of transfer functions;

computing a plurality of candidate locations in the environment of the robot;

evaluating each candidate location of the plurality of candidate locations, including:

computing a respective origin score for each selected sound origin of the plurality of selected sound origins, each respective score representing a decrease in sound quality of a sound wave propagating from the selected sound origin to the candidate location according to a particular transfer function having the candidate location as a sound destination; and computing an aggregate score for the candidate location based on the origin scores computed between the selected sound origins and the candidate location;

determining a candidate location of the plurality of candidate locations having a best aggregate score; and providing, to the robot, data that causes the robot to navigate within the environment of the robot to the candidate location having the best aggregate score.

24. The system of claim 23, wherein each origin score represents a measure of volume change or a measure of distortion according to a particular transfer function.

25. The system of claim 23, wherein providing data that causes the robot to navigate within the environment of the robot to the candidate location having the best aggregate score comprises providing data identifying the candidate location.

26. The system of claim 23, wherein providing the data causes the robot to navigate to the candidate location upon receiving a downtime trigger.

27. The system of claim 23, wherein the plurality of transfer functions were computed automatically by the robot navigating within the environment of the robot.

28. The system of claim 23, wherein the one or more computers and one or more storage devices are installed on the robot, and wherein the robot comprises a body and one or more physically moveable components.

29. The system of claim 23, wherein selecting a plurality of sound origins associated with one of the plurality of transfer functions comprises selecting peripheral locations within the environment of the robot.

30. The system of claim 23, wherein selecting a plurality of sound origins associated with one of the plurality of transfer functions comprises selecting locations associated with entryways, doors, or windows.

31. The system of claim 23, the operations further comprising:

determining at least one of a pose and orientation in order to improve its ability to process audio of interest.

* * * * *